United States Patent [19]

Rylatt

[11] Patent Number: 4,684,491
[45] Date of Patent: Aug. 4, 1987

[54] NOZZLE SEAL RETAINING ASSEMBLY AND POSITIONING ASSEMBLY THEREFOR

[75] Inventor: John A. Rylatt, Monroeville Boro, Pa.

[73] Assignee: Westinghouse Electric Corp., Pittsburgh, Pa.

[21] Appl. No.: 817,363

[22] Filed: Jan. 9, 1986

[51] Int. Cl.[4] ............................................ G21C 13/00
[52] U.S. Cl. .................................... 376/203; 376/204; 251/280; 292/256.5; 292/256.69
[58] Field of Search ................ 376/203, 204; 251/280; 292/326, 256.5, 256.69

[56] References Cited

U.S. PATENT DOCUMENTS

| | | | |
|---|---|---|---|
| 4,001,079 | 1/1977 | Rylatt | 376/203 |
| 4,080,255 | 3/1978 | Rylatt | 376/203 |
| 4,524,729 | 6/1985 | Hill | 376/203 |

Primary Examiner—Donald P. Walsh

[57] ABSTRACT

A retaining assembly holds a nozzle seal in the nozzle of a nuclear steam generator vessel. The assembly includes two arcuate beams generally following the curvature of the vessel wall, one beam lying generally alongside the divider plate and the other extending diametrically across the nozzle seal and being coupled thereto. The outer ends of the beams are anchored to the outer edge of the tube sheet and have brace members which bear against the vessel wall. The inner walls of the beams are interconnected by a thrust assembly which bears against the divider plate and includes an adjustable jacking screw means for urging the beams against the tube sheet. The effective length of the beam coupled to the nozzle seal can be varied by selectively replaceable spacers.

A lightweight positioning assembly which simulates the beam coupled to the nozzle seal can be inserted preliminarily to couple to the nozzle seal and the tube sheet for predetermining the anchor position for the other beam and measuring the distance from a point on the positioner to the divider plate for determining the size spacer needed in the retaining assembly.

20 Claims, 10 Drawing Figures

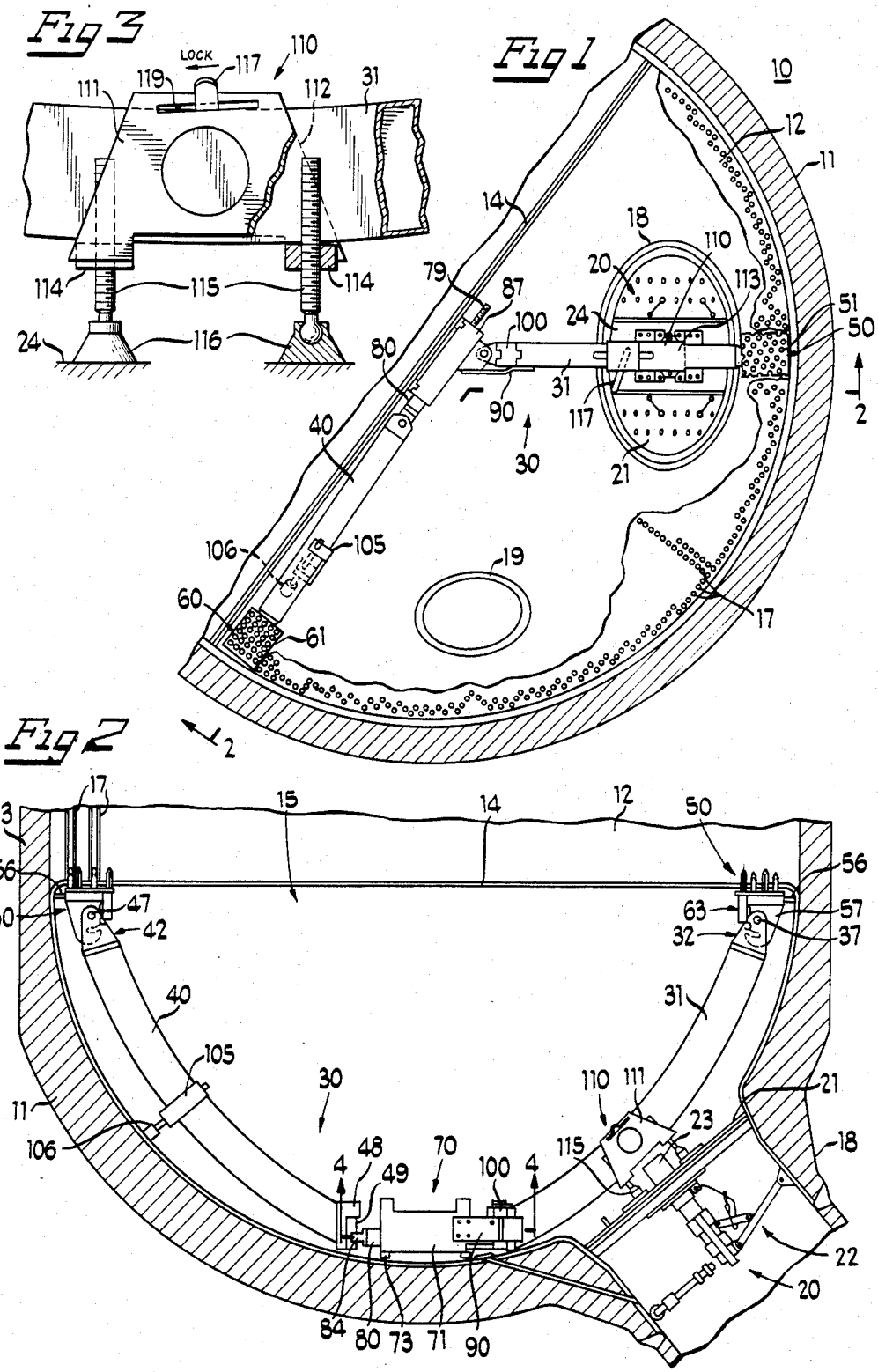

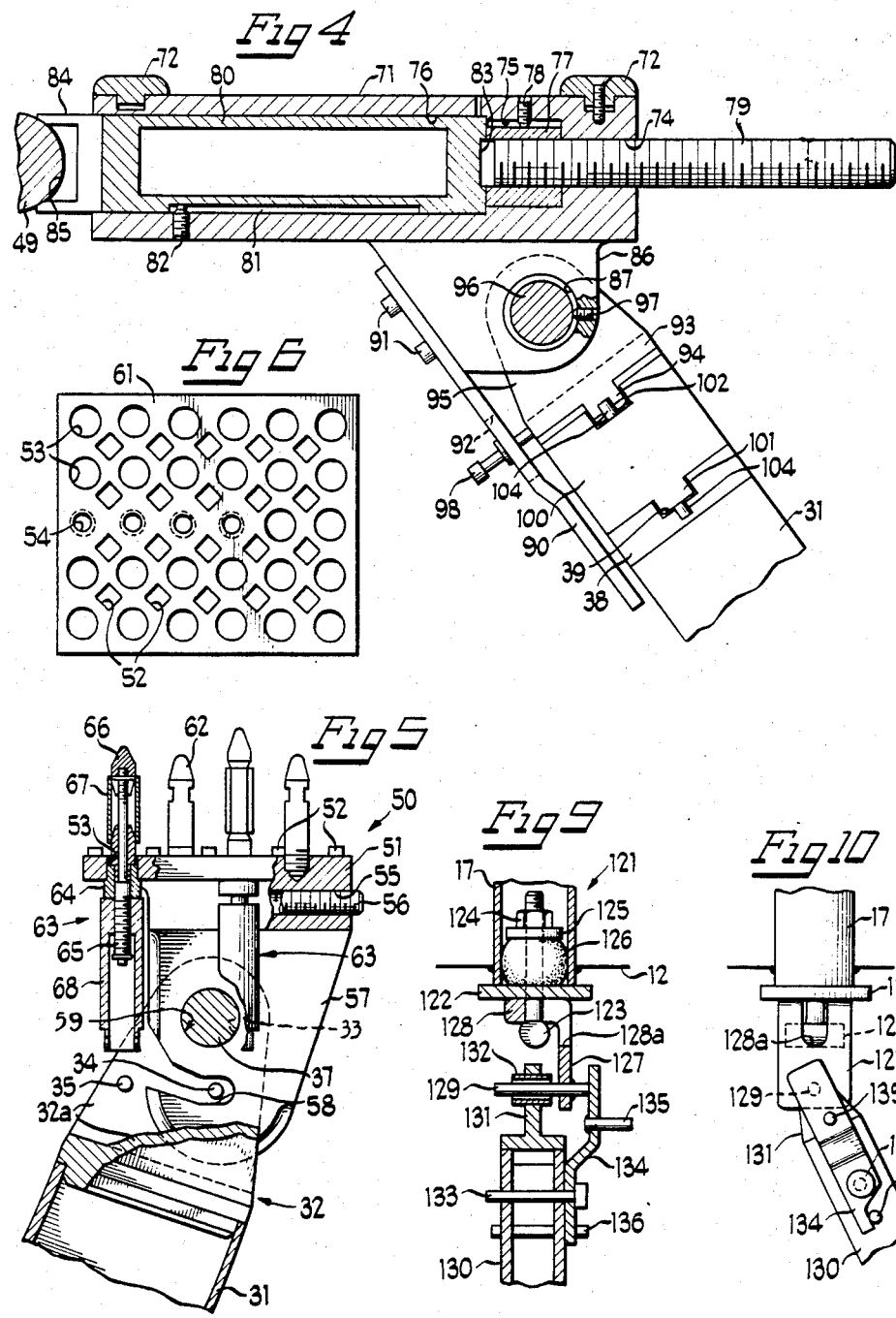

NOZZLE SEAL RETAINING ASSEMBLY AND POSITIONING ASSEMBLY THEREFOR

BACKGROUND OF THE INVENTION

1. Field of the Invention:

The present invention relates to nozzle seals for sealing the nozzles of a nuclear steam generator vessel, and particularly to retraint means for securely holding the nozzle seal in place and preventing inward loosening and displacement thereof by high pressure in the nozzle.

2. Background of the Invention:

During refueling operations in a nuclear generating plant, it is desirable to simultaneously perform maintenance on the steam generator. To do this, the inlet nozzle of the steam generator vessel must be closed off. This is accomplished by use of a nozzle seal or dam which is installed in the nozzle from inside the inlet plenum of the generator vessel. One such nozzle seal is disclosed, for example, in copending U.S. application Ser. No. 605,354 filed Apr. 30, 1984, and entitled "Non-Bolted Ringless Nozzle Dam". Since work must be done within the inlet plenum, the nozzle seal or dam must be fully secured in the nozzle. While the nozzle seal is provided with an anchor assembly for anchoring it in place in the nozzle, nevertheless, this may be insufficient to insure that the nozzle seal will not be dislodged or displaced as a result of large pressure buildups within the nozzle, which could result in release of irradiated coolant from the reactor at great hazard to service and maintenance personnel.

It has been suggested that retention of the nozzle seal be accomplished by a restraint beam which essentially operates like a bar or beam wedged between the nozzle seal and the environmental ledge of the generator vessel. However, such a beam arrangement is quite heavy and difficult to install, resulting in large exposure times. Furthermore, its construction and manner of installation concentrates all the retaining force at a single location on the steam generator environmental ledge, creating a high risk area at that point. Furthermore, such a device does not readily accommodate manufacturing tolerances in the dimensions of the nozzle and the nozzle seal which result in variations in the seating location of the nozzle seal in the nozzle.

SUMMARY OF THE INVENTION

It is a general object of the present invention to provide a nozzle seal retaining apparatus which avoids the disadvantages of other retaining devices while affording additional structural and operating advantages.

An important feature of the invention is the provision of retaining apparatus for a nozzle seal in a nuclear steam generator vessel which is characterized by relatively light weight and ease of installation.

In connection with the foregoing feature, it is another feature of the invention to provide retaining apparatus of the type set forth which is capable of remote installation.

Yet another feature of the invention is the provision of retaining apparatus of the type set forth which distributes the retaining forces at plural locations in the vessel.

It is another feature of the present invention to provide a retaining assembly of the type set forth which is adjustable to accommodate tolerances in the dimensions of the vessel and installation position of the nozzle seal.

In connection with the foregoing feature, it is another feature of the invention to provide lightweight positioning apparatus for determining the necessary adjustment before installation of the retaining apparatus.

In connection with the foregoing feature, still another feature of the invention is the provision of the positioning apparatus of the type set forth which is capable of remote operation.

Certain of these and other features of the invention are attained by providing in a nuclear steam generator vessel having a part-spherical bottom wall cooperating with a horizontal tube sheet and a vertical divider plate to define a plenum having a nozzle, apparatus for retaining a nozzle seal in the nozzle against displacement into the plenum comprising: rigid beam means disposed in the plenum, attachment means connecting the beam means to the nozzle seal, anchor means connecting the beam means to the tube sheet, and coupling means bracing the beam means against the divider plate, whereby the beam means is securely braced between the tube sheet and the divider plate for transferring thereto forces coupled to the beam means from the nozzle seal.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary view in horizontal section through a steam generator vessel, with portions broken away to illustrate in top plan view a nozzle seal retaining assembly constructed in accordance with and embodying the features of the present invention;

FIG. 2 is a fragmentary view in vertical section taken along the line 2—2 in FIG. 1;

FIG. 3 is an enlarged, fragmentary, side elevational view of the coupling clamp illustrated in FIG. 2, with portions broken away more clearly to illustrate the construction;

FIG. 4 is an enlarged fragmentary view in horizontal section taken along the line 4—4 in FIG. 2;

FIG. 5 is an enlarged, fragmentary, side elevational view of one of the anchor assemblies of the retaining assembly of FIG. 1;

FIG. 6 is a further enlarged top plan view of the base plate of the other anchor assembly of the retaining assembly of FIG. 1;

FIG. 9 is an enlarged fragmentary view taken along the line 9—9 in FIG. 8; and

FIG. 10 is a fragmentary side elevational view of the mechanism illustrated in FIG. 9, as viewed from the righthand side thereof.

DESCRIPTION OF THE PREFERRED EMBODIMENT

Figure 7:
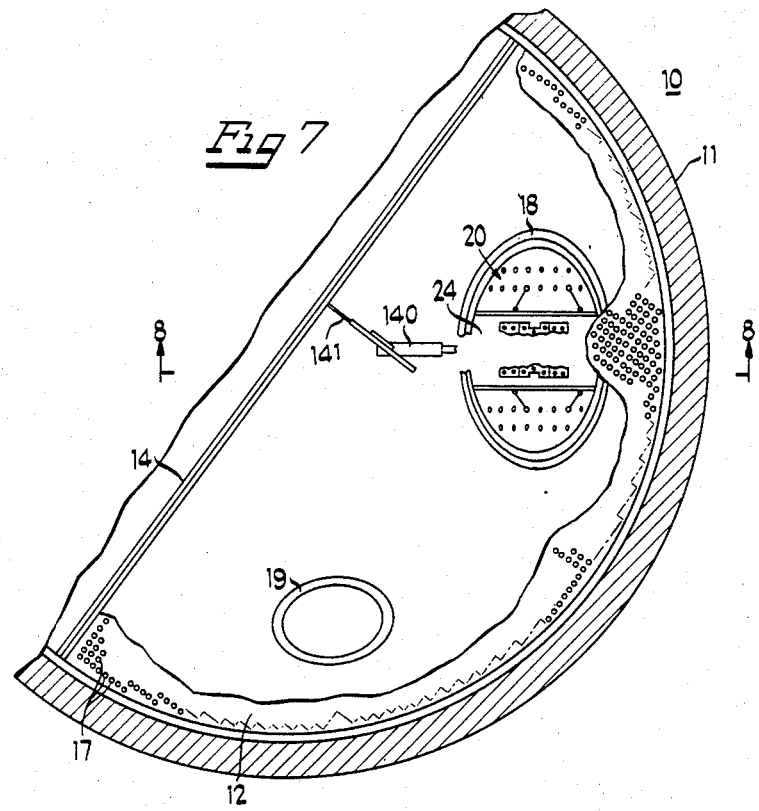
FIG. 7 is a view similar to FIG. 1, illustrating positioning apparatus in accordance with the present invention.

Referring to FIGS. 1 and 2 there is illustrated a portion a nuclear steam generator vessel 10 have a generally part-spherical bottom wall 11 closed at the top thereof by a horizontally disposed circular tube sheet 12. The upper end of the vessel 10 (not shown) comprises a cylindrical side wall 13 which is continuous with the bottom wall 11 and houses a tube bundle. A vertical divider plate 14 extends diametrically across the space beneath the tube sheet 12 and divides it into two plena 15, one of which is illustrated. The tube bundle includes a plurality of generally inverted U-shaped tubes 17, having the lower ends thereof disposed through complementary bores in the tube sheet 12. The vertical portions of each tube 17 respectively communicate with the plena 15. Also, respectively communicating with the plena 15 and projecting outwardly from the bottom wall 11 are two nozzles 18 (one shown) adapted to be secured to an associated conduit which extends to an associated nuclear reactor vessel (not shown). Also formed in the bottom wall 11 are two manways (one shown), respectively providing access to the plena 15.

A nozzle seal or dam 20 is disposed in the nozzle 18, and may be of any desired type, but as illustrated is similar to that disclosed in the aforementioned copending U.S. application Ser. No. 605,354. The nozzle dam 20 includes a seal assembly 21 which extends across and closes the nozzle 18 in sealing engagement therewith around the entire circumference thereof, and an anchor assembly 22 which is adapted for frictional engagement of the inner surface of the nozzle 18 securely to anchor the nozzle dam 20 in place. The nozzle dam 20 may include a hub portion 23 which projects axially inwardly from the seal assembly 21. Also formed on the inner surface of the seal assembly 21 are bearing pads 24 (see FIG. 1). The seal assembly 21 is disposed in wedging engagement with a frustoconical portion of the inner surface of the nozzle 18. Therefore, it will be appreciated that an elevated pressure inside the plenum 15 will tend to urge the seal assembly 21 into even firmer sealing engagement with the nozzle wall. However, in the event of high pressure on the nozzle side of the seal assembly 21, it is possible that the pressure differential could serve to unseat the seal assembly 21 sufficiently to permit leakage of irradiated coolant into the plenum 15, despite the anchoring action of the anchor assembly 22. It is just such pressure conditions which obtain when the steam generator vessel 10 is drained for maintenance purposes.

In order securely to retain the nozzle dam 20 against such unseating or other inward displacement, there is provided a retaining assembly 30 in accordance with the present invention. Referring also to FIGS. 3-6, the retaining assembly 30 includes two elongated arcuate beams 31 and 40 which are of similar construction and which have a curvature similar to that of the bottom wall 11. Each of the beams 31 and 40 is of hollow construction, substantially rectangular in transverse cross section. Secured to one end of the beam 31 is a coupling clevis 32 having a pair of clevis legs 32a (see FIG. 5) with aligned apertures 33 therethrough. Interconnecting the legs 32a beneath the aperture 33 is a retaining a pin 34. A hole 35 in one of the legs 32a has coupled thereto a short tether cable (not shown) which tethers a pivot pin 37, adapted to fit through the apertures 33.

Fixedly secured to the other end of the beam 31, as by welding, is a coupling block 38 provided with an elongated rectangular groove 39 in the outer surface thereof.

The beam 40 is also provided at one end thereof with a coupling clevis 42 which is constructed substantially as a mirror image of the coupling clevis 32 and is provided with a pivot pin 47. Secured to the other end of the beam 40 is a coupling block 48 to which is integrally connected a cylindrical bearing pin 49 arranged so that, in use, its axis will be disposed substantially vertically.

Referring to FIGS. 1, 2, 5 and 6, the ends of the beams 31 and 40 which carry the coupling clevises 32 and 42 are respectively adapted to be coupled to anchors 50 and 60 which are of similar construction, so that only one will be described in detail. The anchor 50 has a flat rectangular base plate 51 carrying a plurality of aligned rows of upwardly projecting rectangular lugs 52. Formed through the base plate 51 are a plurality of bores 53 and internally threaded sockets or recesses 54. Extending horizontally into the base plate 51 from one end thereof is an internally threaded bore 55 in which is threadedly received a bearing stud 56. Integral with the base plate 51 and depending therefrom is a flat hook 57 having a hook slot or notch 58 formed in one side thereof and having a circular bore 59 extending therethrough above the slot 58. The anchor 60 is substantially identical to the anchor 50 except that it has a base plate 61 in which the lugs 52, the bores 53 and the recesses 54 are arranged in a different pattern than on the base plate 51 because of the different orientations of the anchors 50 and 60 in use, as will be explained more fully below.

Each of the anchors 50 and 60 includes a plurality of upstanding guide pins 62 threadedly engaged in associated ones of the recesses 54. Each anchor 50 and 60 also includes one or more cam locks 63, each of which has a bushing 64 mounted in a corresponding one of the bores 53 and through which is axially received an elongated stud 65, threadedly coupled at the upper end thereof to an end lug 66 and extending coaxially through an expansible sleeve 67 which is fitted between the bushing 64 and the end lug 66. Threadedly engaged with the lower end of the stud 65 is a manually rotatable handle 68. Rotation of the handle 68 retracts the stud 65 for axially compressing and radially expanding the sleeve 67.

In use, each of the anchors 50 and 60 is mounted to the underside of the tube sheet 12 in a predetermined location adjacent to the outer periphery thereof. The guide pins 62 and the cam locks 63 are fitted up into corresponding ones of the tubes 17 until the lugs 52 bear against the bottom of the tube sheet 12, and the cam lock 63 are operated to expand the sleeves 67 into firm frictional engagement with the inner surfaces of the corresponding tubes 17, firmly to lock the anchor 50 or 60 in place. The beams 31 and 40 are, respectively, coupled to the anchors 50 and 60 by receiving the hook 57 between the clevis legs 32(a), with the retaining pins 34 received in the hook slots 58, and with the hook bores 59 aligned with the clevis apertures 33 for receiving the pivot pins 37 and 47 therethrough. When the anchors 50 and 60 are thus secured to the tube sheet 12 and coupled to the beams 31 and 40, the beams 31 and 40 depend from the anchors 50 and 60 and generally follow the curvature of the bottom wall 11.

The retaining assembly 30 is positioned in the plenum 15 so that the beam 31 extends substantially diametrically across the nozzle 18 while the beam 40 extends adjacent and substantially parallel to the divider plate 14. Thus, the anchor 50 is fitted to the tube sheet 12 near its junction with the bottom wall 11, as illustrated in FIG. 1, so that the beam 31 will be disposed substantially in a vertical plane which extends diametrically across the nozzle 18 and through the vertical center line of the divider plate 14. The anchor 60 is positioned in an upper corner of the plenum 15 at the junction of the bottom wall 11, the tube sheet 12 and the divider plate 14. The tubes 17 are arranged in perpendicular columns and rows which are substantially parallel to the edges of the base plate 61 in its mounted position. Because of the angled orientation of the anchor 50, the edges of its base plate 51 will be inclined with respect to the columns and rows of the tubes 17, necessitating the different arrangement of the lugs 52, the bores 53 and the recesses 54 in the base plate 51.

The inner or lower ends of the beams 31 and 40 are interconnected by a thrust assembly 70, which is disposed in use at the junction of the bottom wall 11 with the divider plate 14 at the bottommost portion of the vessel 10. Referring to FIG. 4, the thrust assembly 70 includes a generally rectangular frame 71 having bearing pads 72 adapted to bear against the divider plate 14 and bearing pad 73 adapted to bear against the bottom wall 11. The frame 71 has a generally horizontally extending internal bore 74 extending therethrough, having a enlarged-diameter counterbore portion 75 and a still further enlarged counterbore portion 76. An internally threaded insert sleeve 77 is received in the counterbore portion 75 and is secured in place by a set screw 78. A jacking screw 79 is received into the bore 74 and threadedly engaged in the sleeve 77.

Slidably received in the counterbore portion 76 is an elongated hollow cylinder 80 closed at both ends thereof and provided with an elongated shallow groove 81 in the outer surface thereof. A set screw 82 is seated in the groove 81 to prevent the cylinder 80 from rotating. The cylinder 80 is provided with a circular slot or recess 83 in its inner end for receiving the inner end of the jacking screw 79. The outer end of the cylinder 80 is provided with an end cap 84 having an arcuate bearing recess 85. It will be appreciated that the jacking screw 79 can be operated to drive the cylinder 80 axially outwardly to vary the length thereof projecting from the frame 71.

Integral with the frame 71 and projecting from one side thereof are a pair of spaced-apart parallel clevis lugs 86 having vertically aligned holes 87 therethrough. A generally rectangular alignment plate 90 spans the cleves lugs 86 and is fixedly secured thereto, as by fasteners 91, the alignment plate 90 having an elongated slot 92 therethrough centrally thereof. A coupling block 93 has an elongated rectangular rib 94 projecting therefrom and is provided with a pair of parallel, spaced-apart clevis lugs 95, which are respectively disposed along the inner sides of the clevis lugs 86, and respectively have openings (not shown) therethrough disposed in alignment with the clevis holes 87 for receiving therethrough a pivot pin 96, locked in place as by a set screw 97. A stud 98 is threadedly engaged with the coupling block 93 and projects outwardly therefrom through the slot 92 in the alignment plate 90. It will be appreciated that the coupling block 93 is pivotally movable with respect to the frame 71, the pivotal movement being limited by the length of the stud 98.

A spacer block 100 is engaged with the coupling block 93. More particularly, the spacer block 100 is generally rectangular in shape and is provided with an elongated rectangular rib 101 projecting from one side thereof and has a rectangular elongated channel 102 formed in the other side thereof. In use, the rib 101 is adapted to be received in the groove 39 in the coupling block 38 of the beam 31, while the channel 102 is adapted to receive therein the rib 94 of the coupling block 93, so that the spacer block 100 occupies the space between the inner end of the beam 31 and the thrust assembly 70. In use, the rib 94 of the coupling block 93 is disposed vertically, so that the spacer block 100 can be dropped into position. In this regard, the spacer block 100 is provided with horizontally aligned stop pins 103 and 104 at the upper end thereof projecting, respectively, from the rib 101 and into the channel 102 for engagement, respectively, with the upper ends of the rib 94 and the coupling block 38 to limit the depth of insertion of the spacer block 100.

A generally C-shaped spacer bracket 105 straddles the beam 40 intermediate the ends thereof and is provided with an elongated bearing screw 106 which is threadedly engaged therewith and extends through a complementary opening (not shown) in the beam 40. Once the assembly 30 has been tensioned into the position, the bearing screw 106 is extended until it bears against the adjacent portion of the bottom wall 11, as illustrated in FIG. 2, to provide the central support for the beam 40.

There is also provided a coupling clamp 110 which is generally in the form of a hollow trapezoidal frame, through which the beam 31 is slidably extended. More specifically, referring to FIG. 3, the coupling clamp 110 includes a pair of spaced-apart trapezoidal side plates 111 and 112 interconnected at the upper ends thereof by a rectangular top plate 113, and interconnected and the lower ends thereof by a pair of spaced-apart rectangular foot plates 114. Elongated threaded studs 115 are respectively threadedly engaged with the foot plates 114 substantially perpendicular thereto, and projecting upwardly through elongated slots in the beam 31. The lower ends of the studs 115 are respectively coupled to feet 116 which bear against the bearing pads 24 on the nozzle dam 20. A clamp lever 117 is disposed beneath the top plate 113 and is pivotally coupled thereto by a pivot pin (not shown), the clamp lever 117 extending laterally outwardly through an elongated inclined cam slot 119 in the side plate 111.

In installation of the retaining assembly 30, the anchors 50 and 60 are first installed in the predetermined positions on the tube sheet 12. Then the beam 31 is placed in the plenum 15 and hooked onto the anchor 50 and the pivot pin 37 is installed. Next, the beam 40 is placed in the plenum 15 and hooked to the anchor 60, and the lower end of and the pivot pin 47 is installed. The thrust assembly 70 with the cylinder 80 fully retracted, is placed in the plenum 15 at the bottom thereof along the divider plate 14. The beam 31 is then centered over the nozzle 18. Next the thrust assembly 70 is pushed over along the divider plate 14 toward the beam 31 until the alignment plate 90 touches the side of the beam 31 with the thrust assembly frame 71 still in engagement with the divider plate 14. Graduations may be provided on the alignment plate 90 which can be remotely read to determine the required dimension of spacer block 100 required to fill the gap between the coupling block 93 on the thrust assembly 70 and the coupling block 38 on the beam 31. The proper size spacer block 100 is then dropped into place.

The jacking screw 79 is then operated to move the end cap 84 of the cylinder 80 into engagement with the bearing pin 49 on the beam 40. The screw 79 is then tightened to a predetermined torque to tighten the entire retaining assembly 30. The clamp lever 117 of the coupling clamp 110 is then released and the clamp 110 is adjusted to center the studs 115 over the bearing pads 24 on the nozzle dam 20. The clamp lever 117 is then relocked by moving it to the lower end of the cam slot 119 and into camming engagement with the upper surface of the beam 31 for cooperation with the foot plates 114 firmly to clamp the beam 31 therebetween. The bearing screw 106 on the spacer bracket 105 is tightened against the vessel bottom wall 11 to a predetermined torque, and then the studs 115 are also tightened against the bearing pads 24. Finally, the bearing studs 56 on the anchors 50 and 60 are tightened against the bottom wall 11 and the cam locks 63 may then be removed, if desired.

With the retaining assembly 30 thus installed in place, any inwardly-directed forces on the nozzle dam 20 will be transmitted into the beams 31 and 40. From the beams 31 and 40, radial loads are transmitted directly to the vessel bottom wall 11 through the bearing studs 56, vertical loads are transferred to the tube sheet 12 by the lugs 52 of the anchors 50 and 60, and horizontal loads are transferred to the divider plate 14 through the thrust assembly 70. It is significant that the retaining assembly 30 weighs only about half as much as existing restraint beam devices, thereby facilitating remote installation by suitable tools from outside the vessel 10. By use of the auxiliary beam 40 and anchoring to the tube sheet 12 at spaced-apart locations, the assembly 30 is more secure and retaining forces are distributed and the arcuate design of the beams 31 and 40 gives rise to a greater rigidity of the overall structure.

While the size of spacer block 100 can be determined from gradations on the alignment plate 90, it is desirable if this dimension, as well as the proper mounting locations for the anchors 50 and 60, can be predetermined before installation of the retaining assembly 30. Referring to FIGS. 7–10, there is provided for this purpose a positioning assembly 120 which includes a locking mechanism 121 adapted to be mounted on the tube sheet 12. More specifically, referring to FIGS. 9 and 10, the locking mechanisms 121 includes a flat rectangular base plate 122 which receives through a complementary aperture therein the long stem of a T-bar 123. The distal end of the stem is adapted for threaded engagement with a nut 124 for cooperation with a washer 125 to trap an expansible sleeve 126 between the washer 125 and the base plate 122. Disposed beneath the base plate 122 is a right angle cam plate 127 having a thickened leg 128 and provided with a slot 128a therethrough at the angle thereof for receiving the T-bar 123 therethrough. Integral with the thin leg of the cam plate 127 and projecting therefrom parallel to the thick leg 128 is a coupling pin 129.

In use, the locking mechanism 121 is first arranged with the thin leg of the camp plate 127 disposed between the base plate 122 and the cross of the T-bar 123. Then the expansible sleeve 126 is inserted up into a selected one of the tubes 17 until the base plate 122 bears against the lower end of the tube 17 or the tube sheet 12. Then, while the locking mechanism 121 is held in this position, the cam plate 127 is flipped down to the position illustrated in FIG. 9, moving the thick leg 128 between the base plate 122 and the cross of the T-bar 123. This cams the T-bar 123 downwardly for axially compressing and radially expanding the sleeve 126 into frictional engagement with the inner surface of the tube 17, thereby securely mounting the locking mechanism 121 in place.

The positioning assembly 120 also includes an elongated, preferably hollow beam 130 provided at one end thereof with a lug 131 carrying a bushing 132. Mounted for pivotal movement alongside the beam 130 by a pivot pin 133 is a retaining plate 134 provided with a laterally outwardly extending handle 135. Also secured to the beam 130 and projecting laterally therefrom is a stop pin 136. The other end of the beam 130 is secured to a coupling clamp 137, which is provided with a depending sleeve 138. Also secured to the coupling clamp 137 is one end of an elongated hollow beam 140, the distal end of which is provided with an extensible telescoping scale 141 mounted with its axis disposed at a predetermined angle to the axis of the beam 140.

In operation, the locking mechanism 121 is first installed in a selected tube 17 at a nominal position on the tube sheet 12 which will correspond to the location where the anchor 50 is to be mounted. The selected tube 17 will be known from prior experience. Then, the assembly of the beams 130 and 140 and the coupling clamp 137 is inserted in the plenum 15, and the beam 130 is coupled to the locking mechanism 121. More particularly, the bushing 132 is slipped over the free end of the coupling pin 129. Then the retaining plate 134 is pivoted to its retaining position, illustrated in FIGS. 9 and 10, wherein one end of the retaining plate 134 is stopped against the stop pin 136 and the other end thereof is disposed over the inner end of the coupling pin 129 closely adjacent thereto, the retaining plate 134 being held in this position by gravity. It can be seen that the retaining plate 134 effectively prevents the bushing 132 and the beam 130 from being slipped back off the coupling pin 129.

Figure 8:
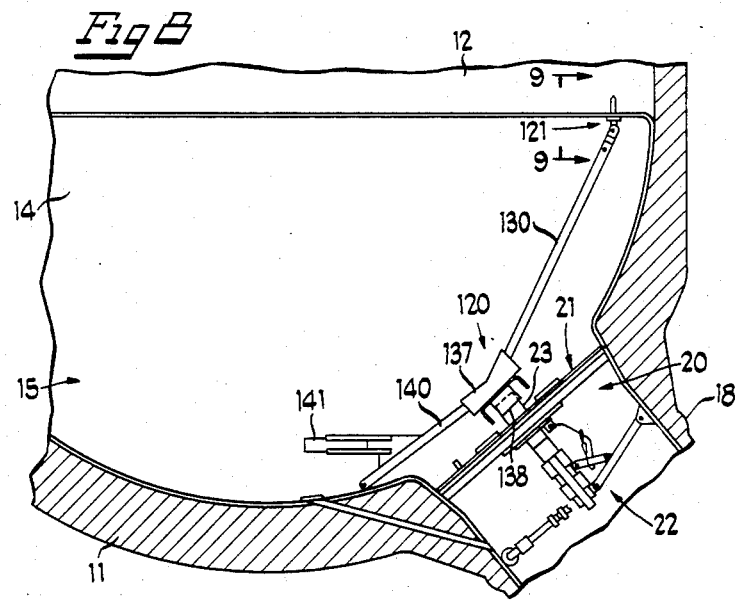
FIG. 8 is a fragmentary view in vertical section taken along the line 8—8 in FIG. 7.

Then, the sleeve 138 of the coupling clamp 137 is fitted down over the hub 23 of the nozzle dam 20, encircling same as illustrated in FIG. 8, with the free end of the beam 140 lying along the bottom wall 11 of the vessel 10. The mounting position of the locking mechanism 121 will be such that when the parts are thus assembled, the beams 130 and 140 lie in a plane which extends diametrically across the nozzle 18 and through the vertical center line of the divider plate 14. If the parts do not fall precisely in this orientation, the locking mechanism 121 may be repositioned.

It will be appreciated that the positioning assembly 120 is dimensioned and arranged so that the coupling clamp 137 corresponds to the coupling clamp 110 of the retaining assembly 30, while the beams 130 and 140 correspond to those portions of the beam 31 which respectively lie above and below the coupling clamp 110. Thus, when the positioning assembly 120 is mounted in position, as described above, the lower or distal end of the beam 140 will be disposed at a predetermined point along the bottom wall 11 which corresponds to the point at which the inner end of the beam 31 would fall. When thus arranged, the extensible scale 141 will be disposed with its axis substantially perpendicular to the divider plate 14 and it is then extended until it touches the divider plate 14. The scale 141 carries gradations (not shown) which are calibrated to take account of the angle between the scale 141 and the beam 140, and from which can be determined the size of spacer block 100 which must be utilized in installation of the retaining assembly 30.

The positioning assembly 120 is then removed and the retaining assembly 30 is installed, the guide pins 62 of the anchor 50 being disposed in tubes 17 which bear a predetermined positional relationship to the tube in which the locking mechanism 121 was installed. A significant aspect of the invention is that the positioning assembly 120 is very lightweight, preferably weighing only five or ten pounds, so that it can very easily be remotely installed and maneuvered in the plenum 15.

From the foregoing, it can be seen that there has been provided an improved retaining assembly for retaining a nozzle seal in place, the assembly being characterized by improved rigidity and security, with forces being transmitted to the tube sheet and vessel wall at spaced locations, the assembly being lightweight and capable of remote installation and being adjustable to accommodate dimensional tolerances in the steam generator vessel and the nozzle dam and variations in the positioning of the assembly. There has also been provided a unique lightweight positioning assembly to predetermine the mounting positions and adjustment dimensions for the retaining assembly.

I claim as my invention:

1. In a nuclear steam generator vessel having a part-spherical bottom wall cooperating with a horizontal tube sheet and a vertical divider plate to define a plenum having a nozzle, apparatus for retaining a nozzle seal in the nozzle against displacement into the plenum comprising: rigid beam means disposed in the plenum, attachment means connecting said beam means to the nozzle seal, anchor means connecting said beam means to the tube sheet, and coupling means bracing said beam means against the divider plate, whereby said beam means is securely braced between the tube sheet and the divider plate for transferring thereto forces coupled to said beam means from the nozzle seal.

2. The apparatus of claim 1, wherein said beam means is arcuate in shape.

3. The apparatus of claim 1, wherein said beam means extends substantially diametrically across the nozzle seal.

4. The apparatus of claim 3, wherein said anchor means is connected to the tube sheet adjacent to the vessel bottom wall.

5. The apparatus of claim 4, wherein said anchor means includes lateral brace means engageable with the vessel bottom wall.

6. The apparatus of claim 1, wherein said coupling means is disposed against the divider plate at the bottommost portion thereof.

7. The apparatus of claim 1, wherein said coupling means includes adjustment means for varying the overall dimensions of said apparatus.

8. The apparatus of claim 7, wherein said adjustment means includes replaceable spacer means disposed between said coupling means and said beam means.

9. In a nuclear steam generator vessel having a part-spherical bottom wall cooperating with a horizontal tube sheet and a vertical divider plate to define a plenum having a nozzle, apparatus for retaining a nozzle seal in the nozzle against displacement into the plenum comprising: first and second beam means respectively disposed in first and second intersecting planes and each having an inner end and an outer end, said first plane intersecting the nozzle seal and the divider plate, coupling means disposed in engagement with the divider plate and interconnecting said inner ends of said first and second beam means, first and second anchor means respectively anchoring said outer ends of said first and second beam means to the tube sheet, and attachment means connecting said first beam means to the nozzle seal, whereby said beam means is securely braced between the tube sheet and the divider plate for transferring thereto forces coupled to said beam means from the nozzle seal.

10. The apparatus of claim 9, wherein said first and second planes are disposed substantially vertically.

11. The apparatus of claim 10, wherein said first plane extends substantially diametrically across the nozzle seal.

12. The apparatus of claim 9, wherein each of said first and second beam means is arcuate in shape.

13. The apparatus of claim 12, wherein each of said first and second anchor means is connected to the tube sheet adjacent to the vessel bottom wall.

14. The apparatus of claim 13, wherein each of said first and second anchor means includes lateral brace means engageable with the vessel bottom wall.

15. The apparatus of claim 9, wherein said attachment means comprises clamp means releasably engageable with said first beam means and slidably movable with respect thereto.

16. The apparatus of claim 9, wherein said coupling means includes selectively replaceable spacer means coupled to said first beam means for selectively varying the effective length thereof.

17. The apparatus of claim 9, wherein said coupling means includes jacking means for urging said first and second beam means firmly against the tube sheet.

18. In a nuclear steam generator vessel having a part-spherical bottom wall cooperating with a horizontal tube sheet and a vertical divider plate to define a plenum having a nozzle, wherein a nozzle seal is retained in the nozzle by a retaining assembly anchored to the tube sheet at a predetermined location and having an adjustment portion with a selectively variable dimension, positioning apparatus for predetermining the variable dimension of the adjustment portion comprising: mounting means adapted to be mounted on the tube sheet at the predetermined location, frame means having dimensions equal to predetermined dimensions of the associated retaining assembly, means releasably connecting said frame means to said mounting means and to the nozzle seal in a measuring configuration such that the position of a predetermined point on said frame means defines the position of the adjustment portion of retaining assembly, and measuring means coupled to said frame means for measuring the distance from said predetermined point to the divider plate, thereby to determine the variable dimension of the adjustment portion of the retaining assembly.

19. The apparatus of claim 18, wherein said frame means includes first and second coplanar beams, said first beam extending between said mounting means and the nozzle seal and said second beam extending between the nozzle seal and said predetermined point.

20. The apparatus of claim 19, wherein the plane of said first and second beam means is disposed substantially vertically and extends diametrically across the nozzle seal and through the midline of the divider plate, said measuring means extending substantially perpendicular to the divider plate.

* * * * *